US011766991B2

(12) United States Patent
Gray (10) Patent No.: US 11,766,991 B2
(45) Date of Patent: Sep. 26, 2023

(54) SEAT BELT SYSTEM (71) Applicant: Joyson Safety Systems Acquisition LLC, Auburn Hills, MI (US)

(72) Inventor: Mark Gray, Macomb, MI (US)

(73) Assignee: JOYSON SAFETY SYSTEMS ACQUISITION LLC, San Diego, CA (US)

(*) Notice: Subject to any disclaimer, the term of this patent is extended or adjusted under 35 U.S.C. 154(b) by 0 days.

(21) Appl. No.: 17/564,946

(22) Filed: Dec. 29, 2021

(65) Prior Publication Data
US 2022/0203929 A1 Jun. 30, 2022

Related U.S. Application Data

(60) Provisional application No. 63/131,679, filed on Dec. 29, 2020.

(51) Int. Cl.
*B60R 22/46* (2006.01)

(52) U.S. Cl.
CPC ...... *B60R 22/4619* (2013.01); *B60R 22/4604* (2013.01); *B60R 22/4628* (2013.01)

(58) Field of Classification Search
CPC ............ B60R 22/4619; B60R 22/4628; B60R 22/4633; B60R 2022/4638; B60R 22/1955; B60R 22/1952; B60R 22/1954; B60R 22/4604
See application file for complete search history.

(56) References Cited

U.S. PATENT DOCUMENTS

| 5,294,150 | A | 3/1994 | Steffens, Jr. | |
|---|---|---|---|---|
| 6,237,958 | B1 * | 5/2001 | Patrickson | B60R 22/1952 180/371 |
| 6,419,271 | B1 * | 7/2002 | Yamada | B60R 22/1952 280/801.1 |
| 6,561,936 | B1 | 5/2003 | Betz et al. | |
| 7,823,924 | B2 | 11/2010 | Dewey et al. | |
| 2002/0084633 | A1 * | 7/2002 | Heigl | B60R 21/2338 280/730.2 |
| 2006/0220369 | A1 * | 10/2006 | Gray | B60R 22/1955 280/806 |
| 2011/0121621 | A1 | 5/2011 | Masutani | |

FOREIGN PATENT DOCUMENTS

| DE | 29717367 U1 * | 2/1998 | ......... B60R 22/4619 |
|---|---|---|---|
| WO | WO-9613409 A1 * | 5/1996 | ......... B60R 22/1952 |

* cited by examiner

*Primary Examiner* — Drew J Brown
*Assistant Examiner* — Matthew D Lee
(74) *Attorney, Agent, or Firm* — Gordon Rees Scully Mansukhani, LLP (57) ABSTRACT

A pretensioner for a seat belt device in a vehicle includes a cable connected to the seat belt device at a first end of the cable. The pretensioner also includes a base frame containing a pipe. A rod is located within the pipe, and one end of the rod is configured to be subjected to pressure from gas provided by a gas generator. A second end of the cable and a second end of the rod are connected to a swage block. The rod is configured to be driven within the pipe in the pretensioning direction by gas from the gas generator when the gas generator initiates in response to an acceleration of the vehicle greater than a predetermined high acceleration thereby causing the swage block to move and pull the cable to thereby cause a corresponding movement of the seat belt device.

20 Claims, 10 Drawing Sheets

SEAT BELT SYSTEM

CROSS REFERENCE TO RELATED APPLICATION

This application claims the benefit of U.S. Provisional Patent Application No. 63/131,679, filed Dec. 29, 2020, which is incorporated by reference herein in its entirety.

GENERAL DESCRIPTION

The present disclosure relates to a seat belt system that includes a pretensioner.

In a seat belt device or system for a vehicle, an arrangement includes a pretensioner that pulls on a webbing that restrains the vehicle occupant. The pretensioner is activated at the time of a vehicle collision to increase the restraining force on the occupant. The pretensioner may include a hollow cylinder that houses a cable. The cable extends out from the cylinder and has one end that is operatively connected to the webbing. A piston is operatively connected to the other end of the cable housed inside the cylinder. A gas generator is incorporated to supply gas to the cylinder in order to drive the piston in order to cause the pulling of the cable in the pretensioning direction. In some conventional designs, during the pretensioning operation, hot gases from the gas generator may leak past the piston and/or out of the cylinder and may reduce the effectiveness of the pretensioner system and also potentially allow for the release of hot, pressurized gas into the vehicle environment.

An object of the disclosed system is to provide a different and novel configuration from the configuration described above. The disclosed configuration is an improved pretensioner system that reduces the likelihood of hot gases escaping the pretensioner. The improved system is described in more detail below.

BRIEF DESCRIPTION OF THE DRAWINGS

An object of the disclosed system is to provide an improved pretensioner system that reduces the likelihood of hot gases escaping the pretensioner. The improved system is described in more detail below.

DETAILED DESCRIPTION

According to one disclosed embodiment, a seatbelt pretensioner for a seat belt device in a vehicle is shown. The pretensioner, includes a cable connected to the seat belt device at a first end of the cable. The pretensioner also includes a base frame containing a pipe, wherein a rod is located within the pipe, wherein one end of the rod is configured to be subjected to pressure from gas provided by a gas generator. A second end of the cable and a second end of the rod are connected to a swage block. The rod is configured to be driven within the pipe in the pretensioning direction by gas from the gas generator when the gas generator initiates in response to an acceleration of the vehicle greater than a predetermined high acceleration thereby causing the swage block to move and pull the cable to thereby cause a corresponding movement of the seat belt device.

An exemplary embodiment of a seat belt assembly for a vehicle is also disclosed herein. The seatbelt assembly includes a seat belt webbing and a cable connected to the seat belt webbing at a first end of the cable. The base frame includes a pipe, wherein a rod is located in the pipe, and wherein one end of the rod is configured to be exposed to pressure from gas provided by a gas generator. A second end of the cable and a second end of the rod are connected to a swage block. The rod is configured to be driven within the pipe in the pretensioning direction by gas from the gas generator when the gas generator initiates in response to an acceleration of the vehicle greater than a predetermined high acceleration thereby causing the swage block to move and pull the cable to thereby cause a corresponding movement of the seat belt webbing.

According to another exemplary embodiment, a seatbelt pretensioner for a seat belt device in a vehicle is disclosed herein. The pretensioner includes a cable connected to the seat belt device at a first end of the cable. The pretensioner also includes a base frame containing a pipe. A rod is located within the pipe, and one end of the rod is configured to be subjected to pressure from gas provided by a gas generator and the other end of the rod is connected to the second end of the cable. The rod is configured to be driven within the pipe in the pretensioning direction by gas from the gas generator when the gas generator initiates in response to an acceleration of the vehicle greater than a predetermined high acceleration thereby causing the rod to move and pull the cable to thereby cause a corresponding movement of the seat belt device. The pretensioner also includes a wedge located in the base frame and configured to engage the cable and the base frame to prevent the cable from retracting in a retraction direction, wherein the retraction direction is opposite of the pretensioning direction.

Figure 1:
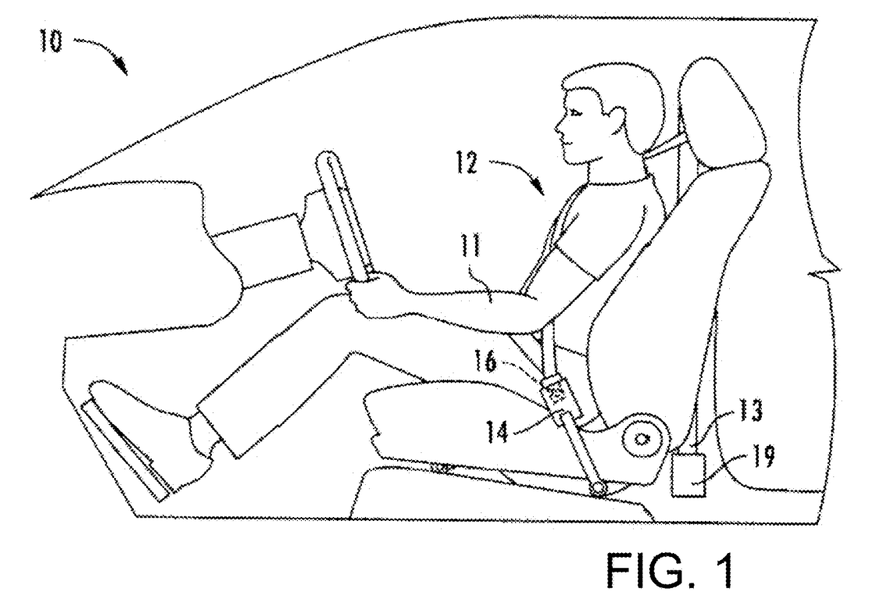
FIG. 1 is a left side view of a vehicle showing a seat belt system including a pretensioner device.
Figure 2:
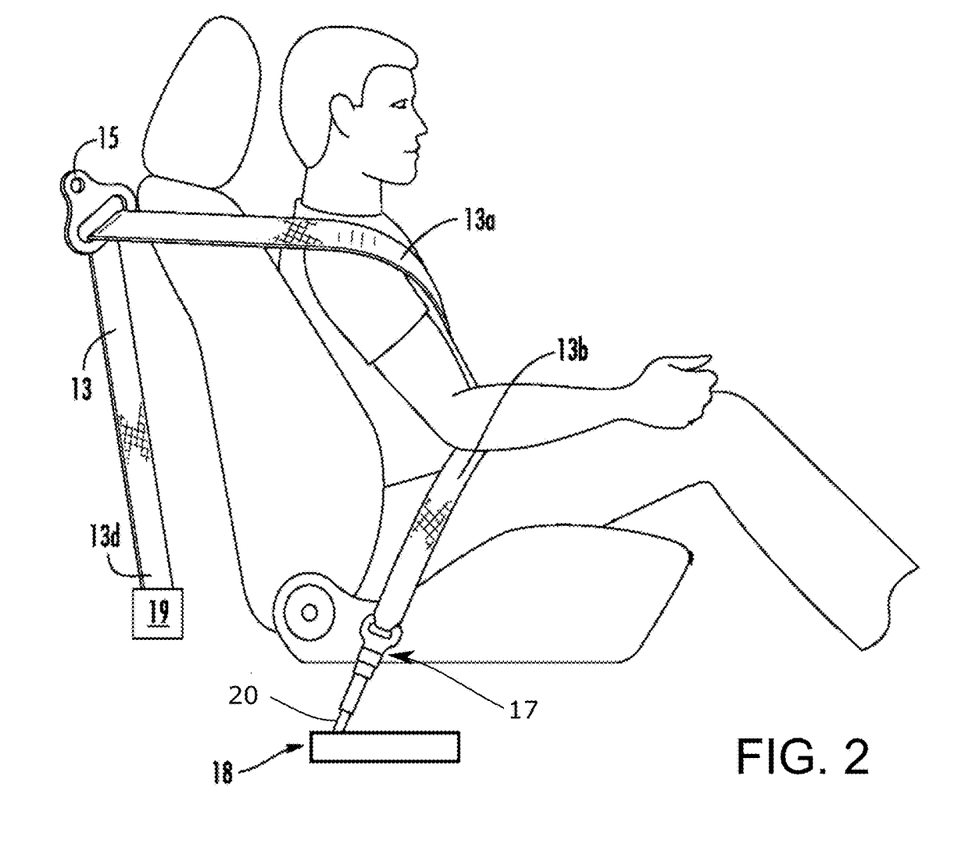
FIG. 2 is a right side view of the seatbelt system of FIG. 1.

FIGS. 1 and 2 illustrate an exemplary embodiment of a vehicle 10 having an interior compartment that is configured to provide seating to an occupant 11. The vehicle 10 includes a seat belt assembly 12 that is configured to secure and restrain the occupant 11 when seated in a seat assembly of the vehicle 10.

As shown, the seat belt assembly 12 (e.g., seat belt system, occupant restraint device, etc.) includes a seat belt 13 (e.g., a webbing) having a shoulder portion 13a and a lap portion 13b that are separated by a tongue member 16 that is configured to selectively (e.g., releasably) engage a buckle mechanism 14. The lap portion 13b of the seat belt 13 is configured to generally wrap around the lap of the occupant 11 to restrain the lower portion of the occupant 11 during a dynamic vehicle event. The lap portion 13b may have an end disposed opposite the tongue member 16 that is configured to be fixed, such as, for example, to a pretensioning device 18 (e.g., a pretensioner) via an anchor 17. The shoulder portion 13a of the seat belt 13 is configured to generally wrap around the torso and shoulder of the occupant to restrain the torso or thorax of the occupant during a dynamic vehicle event.

The shoulder portion 13a may have an end 13d disposed opposite the tongue member 16 that is configured to be secured, for example retractably secured, to a retractor 19. The seat belt 13 is configured to wind (e.g., retract) and unwind (e.g., extract) about the retractor 19, which typically includes a spool for winding the seatbelt. The retractor 19 may be integrated with the seat or attached to the vehicle 10. The seat belt assembly 12 may also include a guide 15 (e.g., a D-ring, etc.), for guiding the shoulder portion 13a of the seat belt 13. The seat belt assembly 12 may have any suitable configuration and may include fewer or additional components to restrain and secure an occupant in a vehicle, and the example disclosed is not limiting.

The pretensioner 18 is configured to tension the seat belt 13, such as during a dynamic vehicle event (e.g., a frontal impact or other crash event), by removing an amount of slack between the seat belt 13 and the occupant 11 that is present at the onset of the dynamic vehicle event. For example, the pretensioner 18 may pull the cable 20 to thereby displace the end of the seat belt 13 a corresponding distance to remove slack between the occupant 11 and the seat belt 13. The seat belt assembly 12 may include a controller that receives input from one or more sensors (not shown) configured to detect an emergency event (e.g. vehicle collision). Although described herein as an anchor mounted pretensioner, the disclosed embodiments of the pretensioner may be mounted to the buckle 14.

Figure 3:
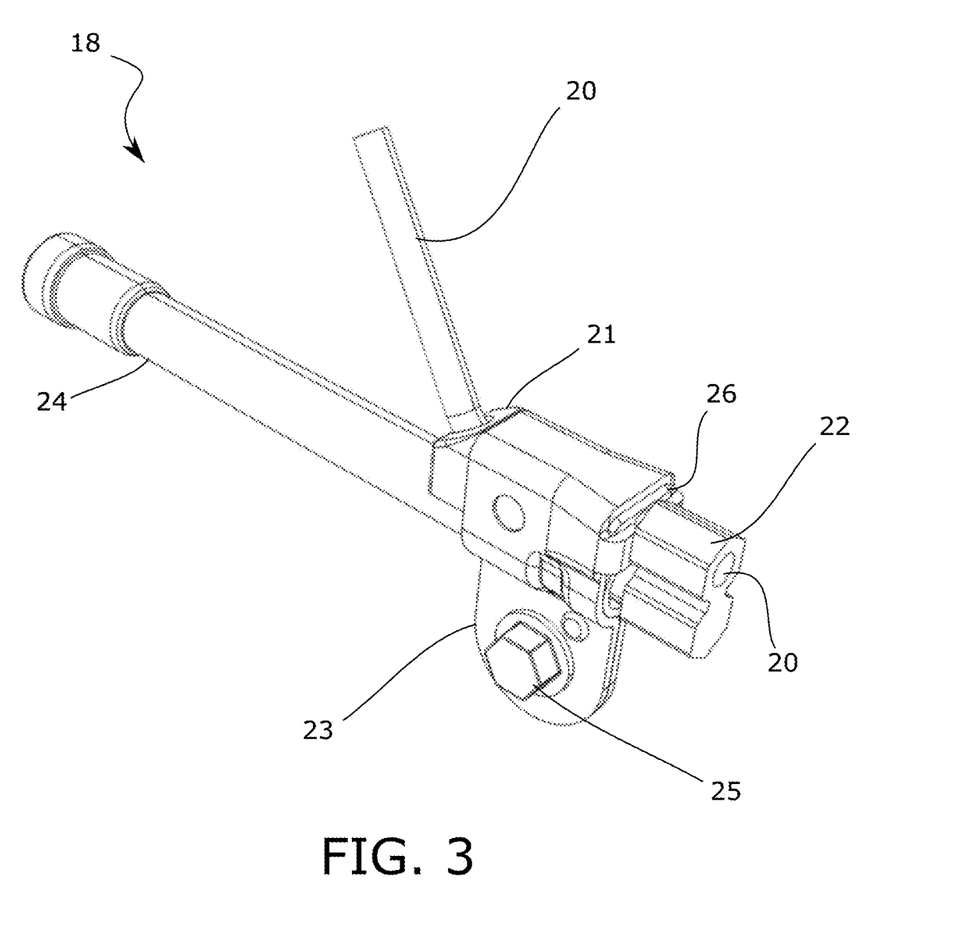
FIG. 3 is an exemplary pretensioner device as shown in FIG. 1.
Figure 4:
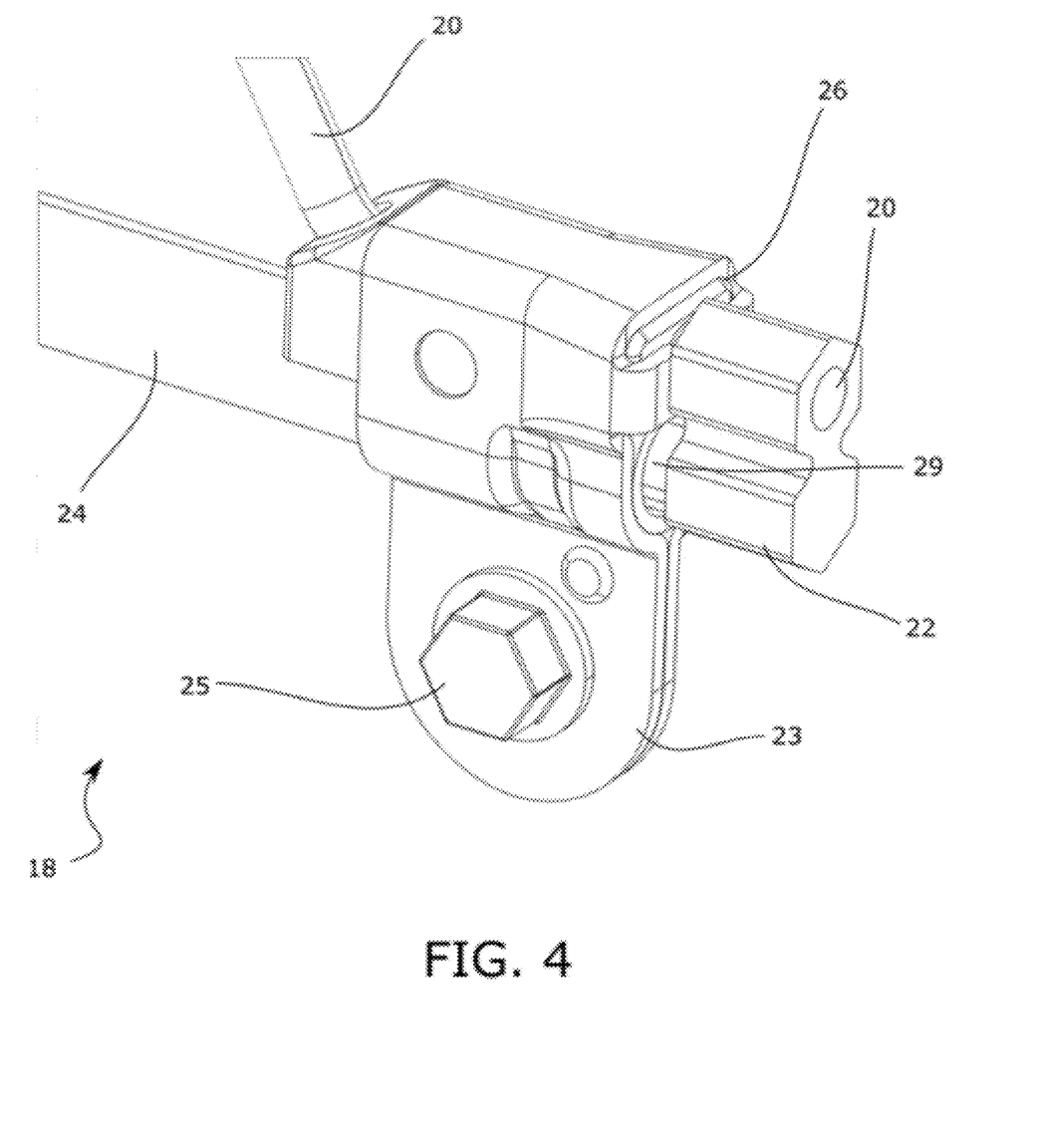
FIG. 4 is a close up view of the pretensioner device as shown in FIG. 3.

FIGS. 3 and 4 show close up views of the pretensioner 18. As shown in the figures, the cable 20 is inserted into the pretensioner 18 through a cable guide 21. The cable guide 21 is partially housed within a base frame 23. Although a cable 20 is shown, the pretensioner 18 may directly hold an end of the seat belt webbing 13. The base frame 23 includes a housing configured to hold various components of the pretensioner 18. The cable 20 extends through the base frame 23 and the cable guide 21 and has an end secured to a swage block 22. The swage block 22 holds the cable at the opposing end of the base frame 23 relative from the cable guide 21.

Figure 5:
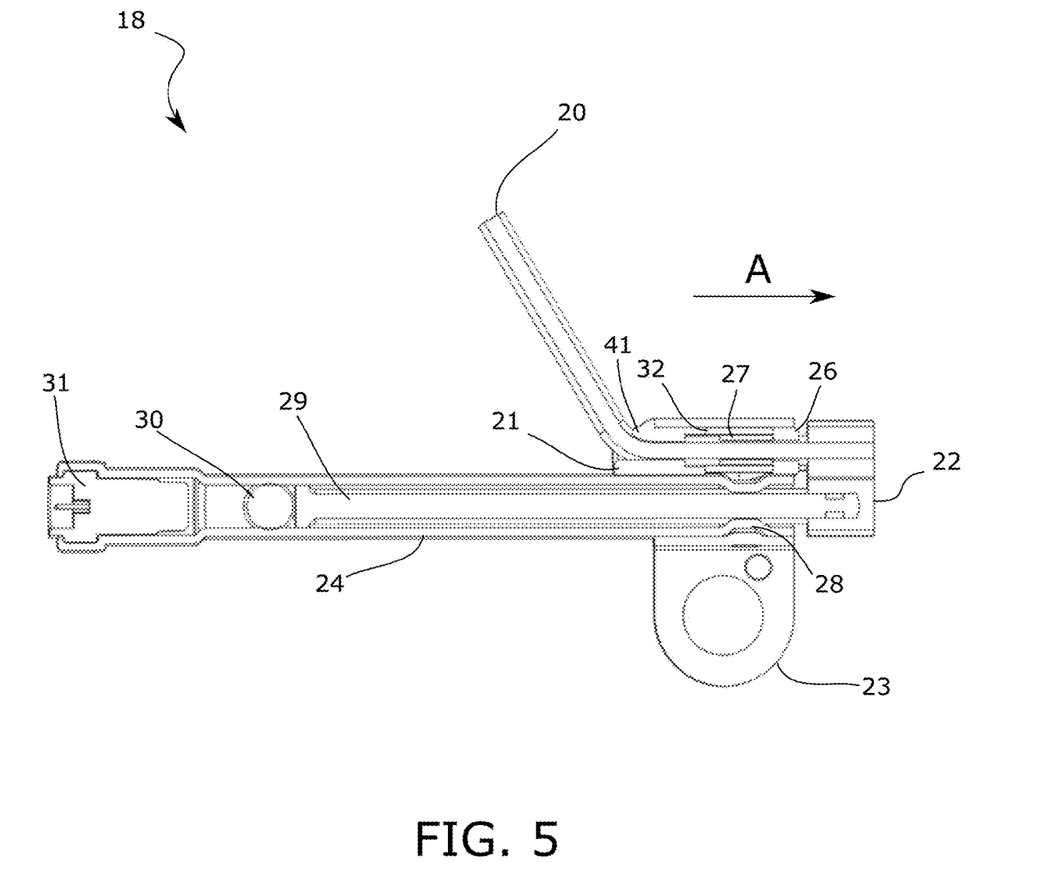
FIG. 5 is a side sectional view of the exemplary pretensioner device shown in FIG. 3.

As shown in FIG. 5, the cable guide 21 is configured to route the cable 20 through a change of direction smoothly into the base frame 23. The cable guide 21 may include a smooth low friction edge 41 in order to prevent damage to the cable during any cable displacement. The cable 20 is connected to the swage block 22 via a suitable mechanism such as, for example, adhesives, fasteners, clamps or crimps. The base frame 23 also holds a pipe or cylinder 24. The pipe 24 may extend parallel to a portion of the cable inside the base frame 23. A fastener 25 is configured to hold portions of the base frame 23 together and may also be configured to anchor the pretensioner to various parts of the vehicle.

FIG. 5 shows an internal view of the pretensioner 18. A wedge housing 32 is located in the base frame downstream, relative to pretensioning direction "A", of the cable guide 21. The wedge housing 32 holds a wedge 27. A spring holder 26 is located downstream of the wedge housing 32 and wedge 27. A spring 33 (described further below) is located between the spring holder 26 and the wedge 27. The spring holder is located at the end of the base frame 23. The pipe 24 is a pressure vessel containing a seal element 30 and a rod 29. A gas generator 31 (e.g. micro gas generator, aka MGG) is located at a first end of the pipe. The gas generator 31 may be a pyrotechnic type generator formed as a tube or can contain an initiator and a propellant. The seal 30 is located within the pipe 24 disposed downstream of the gas generator 31 and upstream of the rod 29. The seal 30 may be a ball type seal which is configured to displace within the pipe 24. The seal 30 is configured to reduce the leakage of the hot gases released from the gas generator out of the pipe 24. The end of the rod 29 is held by the swage block 22. Thus, the swage block 22 is connected to both the cable 20 and the rod 29.

The pipe 24 includes a converging or constricting portion 28 also configured to reduce hot gases released from the gas generator 31 from escaping the pipe 24. The converging portion 28 may circumferentially surround the rod 29 and may engage the entire circumference of the rod at a location adjacent to the converging portion 28. The arrangement and mounting of the components within the pipe 24 creates a tight seal so that the hot gasses expelled from the gas generator to maximize the force imparted onto the seal 30 and the rod 29 and so that leaks are minimized or eliminated. The rod 29 extends coaxially within the pipe 24 and also extends parallel to a portion of the cable 20 inside the base frame 23.

During a dynamic vehicle event (e.g. an acceleration event of the vehicle greater than a predetermined high acceleration such as a vehicle crash) the gas generator 31 is configured to activate and expel high velocity hot gas into the pipe 24. The hot gases push against the seal 30 which drives the rod 29 out of the pipe 24 and base frame 23. The rod 29 will pull the cable 20 via the swage block 22 in the pretensioning direction "A". The movement of the rod 29 and the cable 20 in the pretensioning direction will remove slack between the occupant and the seatbelt during the dynamic vehicle event.

Figure 6:
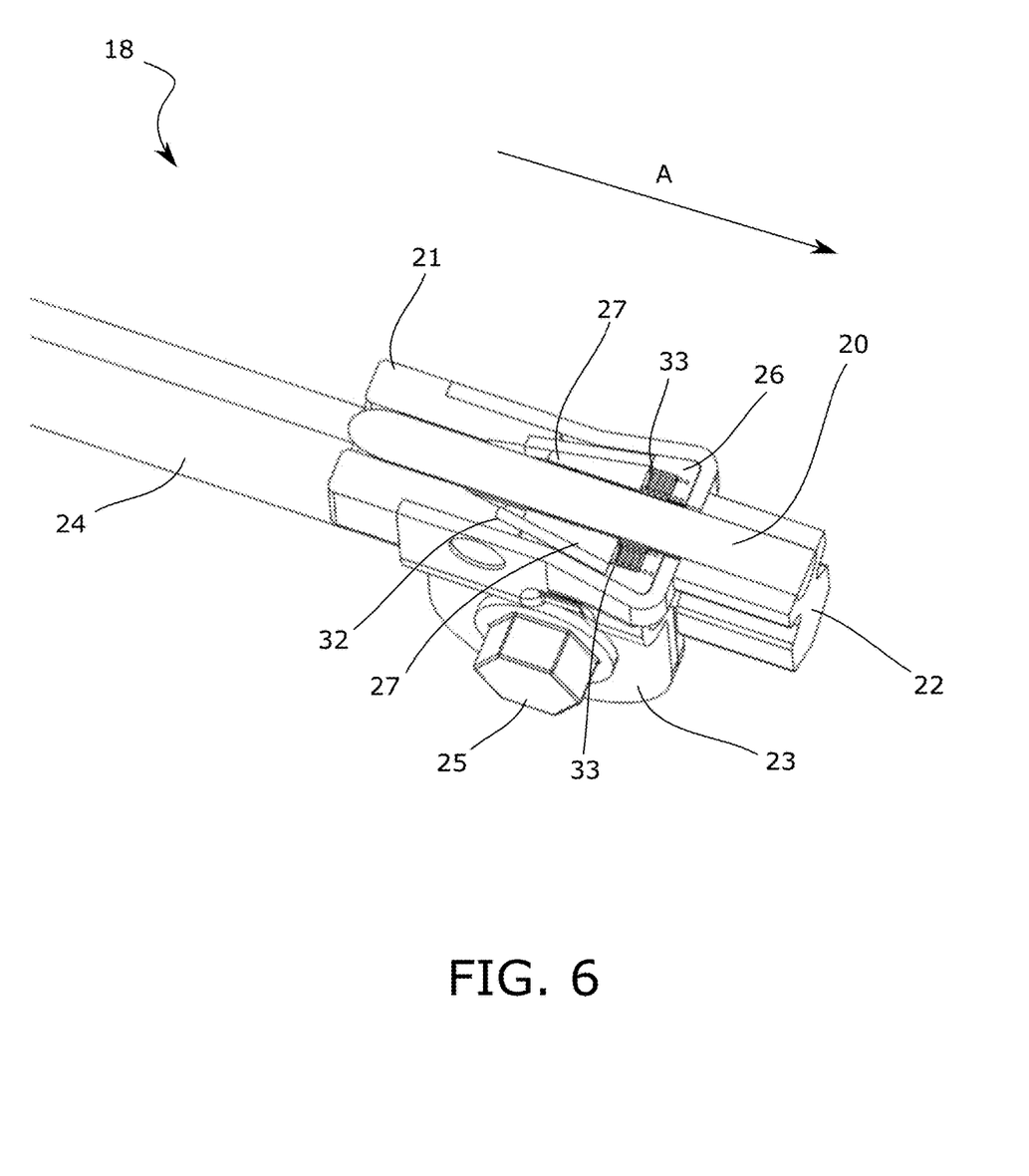
FIG. 6 is a top sectional view of the exemplary pretensioner device shown in FIG. 3.
Figure 7:
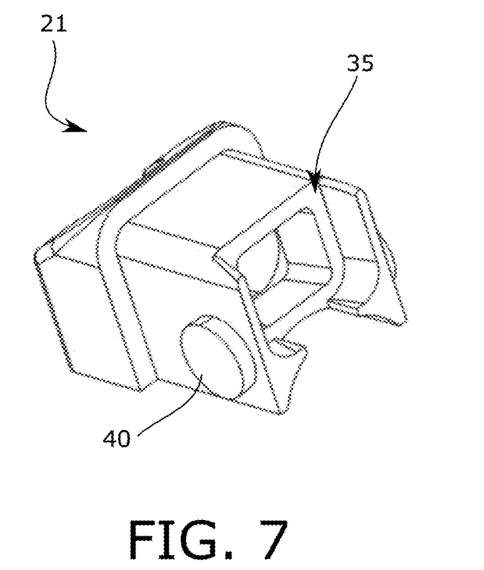
FIG. 7 is a perspective view of an exemplary cable guide used in the pretensioner device shown in FIG. 3.
Figure 8:
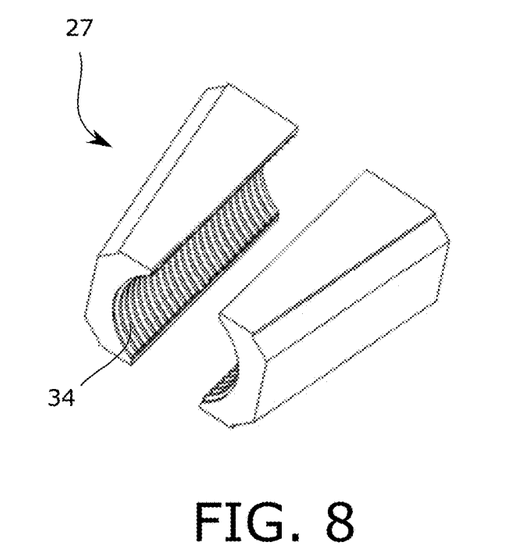
FIG. 8 is an exploded view of an exemplary wedge used in the pretensioner device shown in FIG. 3.
Figure 9:
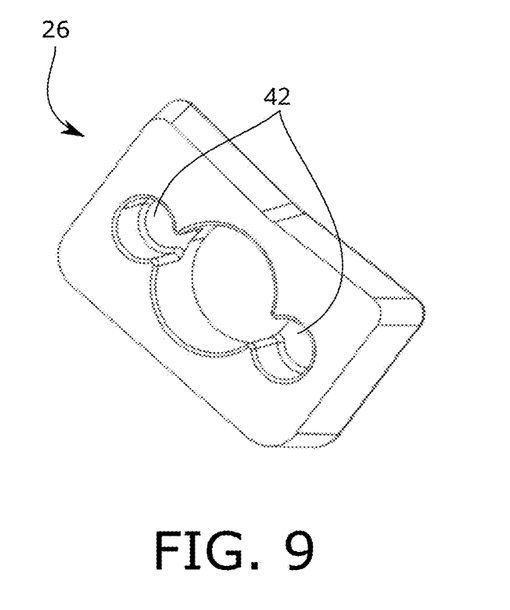
FIG. 9 is a perspective view of an exemplary spring holder used in the pretensioner device shown in FIG. 3.
Figure 10:
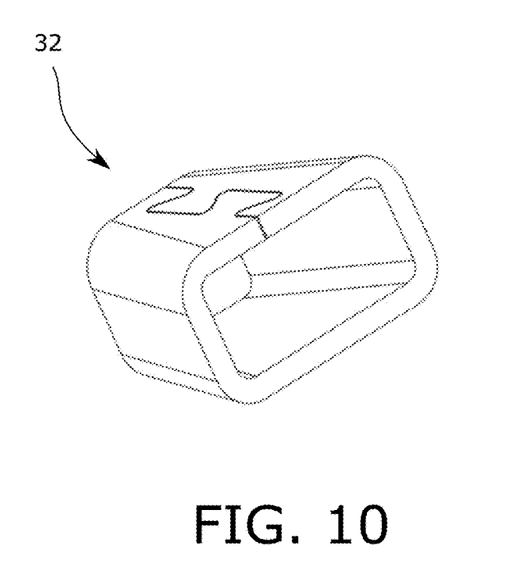
FIG. 10 is a perspective view of an exemplary wedge housing used in the pretensioner device shown in FIG. 3.
Figure 11:
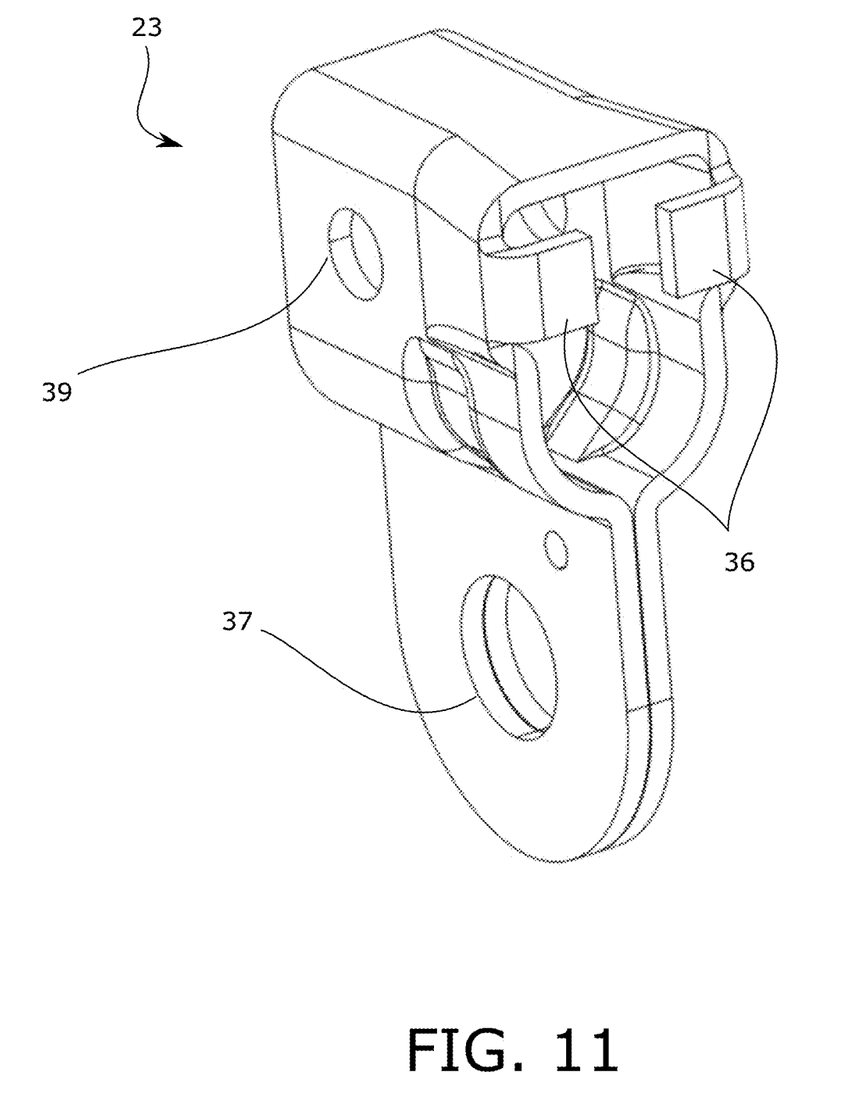
FIG. 11 is a perspective view of an exemplary base frame used in the pretensioner device shown in FIG. 3.

FIG. 6 is a top sectional view of the pretensioner 18. The wedge housing 32 may be partially lodged inside the cable guide 21 at a wedge housing seat 35 as shown in FIG. 7. A portion of the base frame (e.g., the wedge housing 32) holds the wedge 27. The matching configuration and assembly of the wedge 27 and wedge housing 32 is configured to hold the cable 20 after the cable is pulled in the pretensioning direction to prevent the extraction of the cable 20 out of the pretensioner in the direction opposite of the pretensioning direction "A". This allows the pretensioner 18 to hold the seat belt in position after removing the slack during the dynamic vehicle event. As shown in FIG. 8, the wedge 27 includes a textured surface 34 configured to hold cable 20. In this exemplary embodiment, the textured surface 34 is a plurality of ribs. However, other textured surfaces suitable to cause engagement between the cable and the wedge may be employed. The wedge 27 is configured to surround the cable 20. The wedge 27 and the wedge housing 32 have matching tapered surfaces and the wedge 27 is mounted within the wedge housing 32. The tapered stacking interface of the surfaces of the wedge and the wedge housing 32 prevents the wedge 27 from fully exiting the base frame in a direction opposite of the pretensioning direction.

Figure 14:
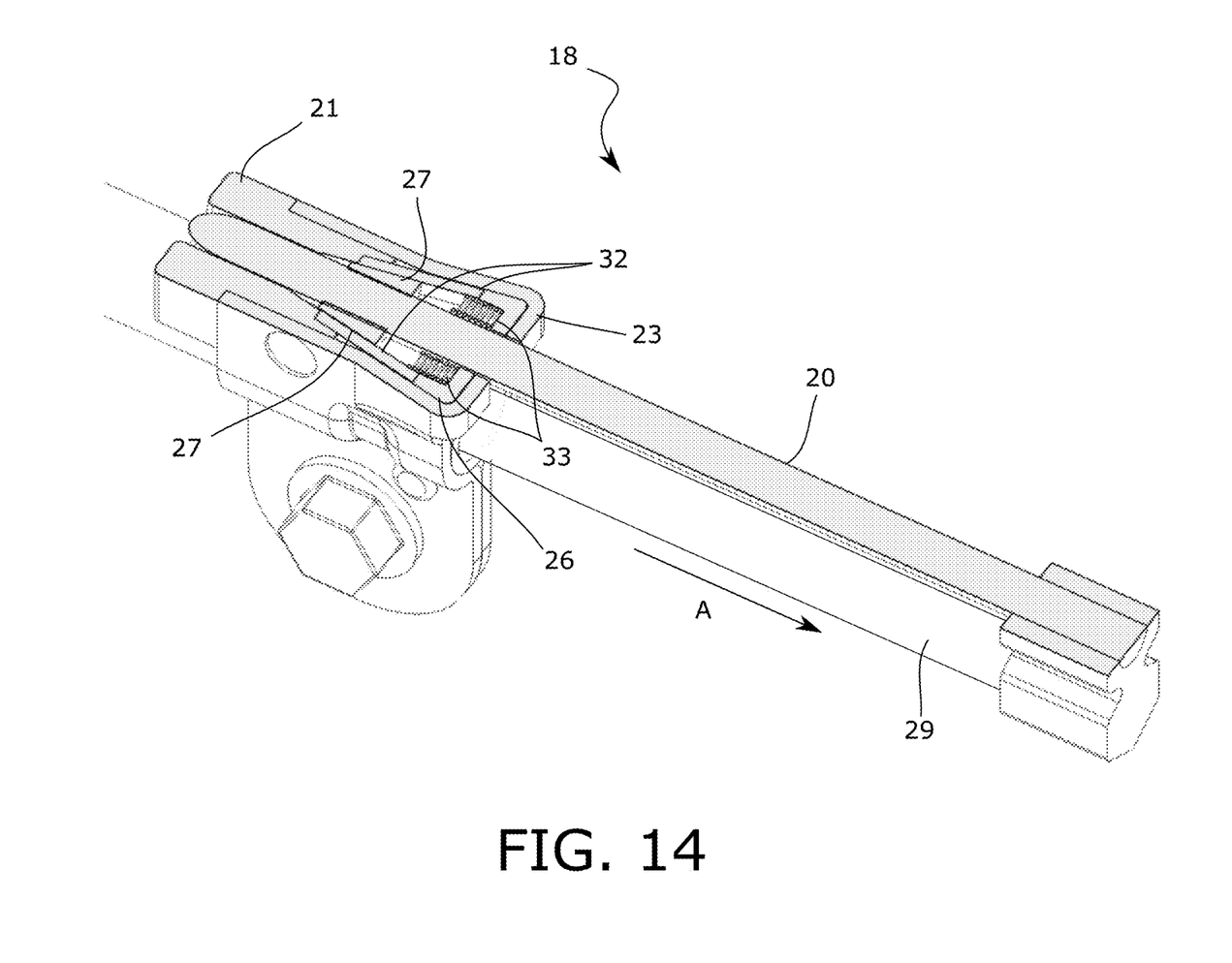
FIG. 14 is a top sectional view of the exemplary pretensioner device of FIG. 1 in a fired state.

The pretensioner 18 includes a spring or springs 33 configured to engage the downstream end of wedge 27. The springs 33 are located between the wedge 27 and spring holder 26. The springs 33 may be disposed on the spring holder 26 and engage the spring holder tabs 36 of the base frame 23. During the pulling of the cable 20 in the pretensioning direction "A", forces imparted from the cable 20 may compress the springs 33 due to the movement of the wedge resulting from the friction between the cable 20 and the wedge 27. The wedge 27 moves with the cable 20 to compress the springs 33. After the cable 20 has been fully retracted in the pretensioning direction "A", the stored energy in the compressed in the springs 33 will then be released and will force the wedge 27 in the opposite direction of the pretensioning direction "A" (i.e. retraction direction). The tapered stacking interface from the wedge housing 32 forces the wedge 27 to clamp down onto the cable 20. As a result, retraction in the direction opposite of the pretensioning direction "A" is prevented as seen in FIG. 14. The wedge 27 may be made of multiple parts, for example two halves as shown in the exemplary embodiment in FIG. 8.

FIGS. 7-11 show the isolated components of the pretensioner 18. The spring holder 26 may be engaged on spring holder tabs 36 of the base frame 23. The spring holder may include spring seats 42 configured to house a portion of the springs 33 and engage one end of the springs 33. A fastening hole 37 may be located on the base frame in order to accommodate for the fastener 25. The base frame may also in include a cable guide hole 39 in order to receive the cable guide projections 40.

Figure 12:
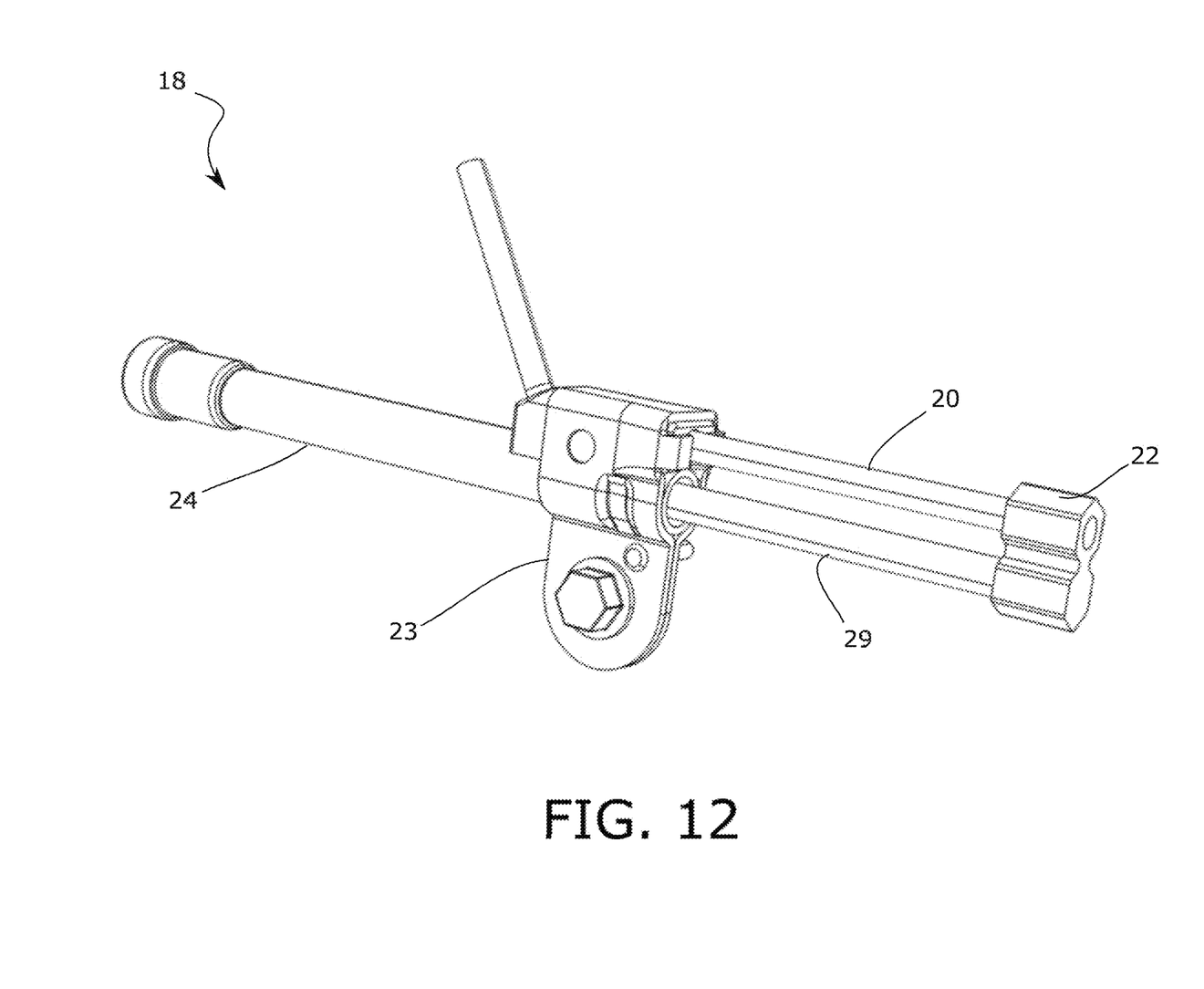
FIG. 12 is a perspective view of the exemplary pretensioner device of FIG. 1 in a fired state.
Figure 13:
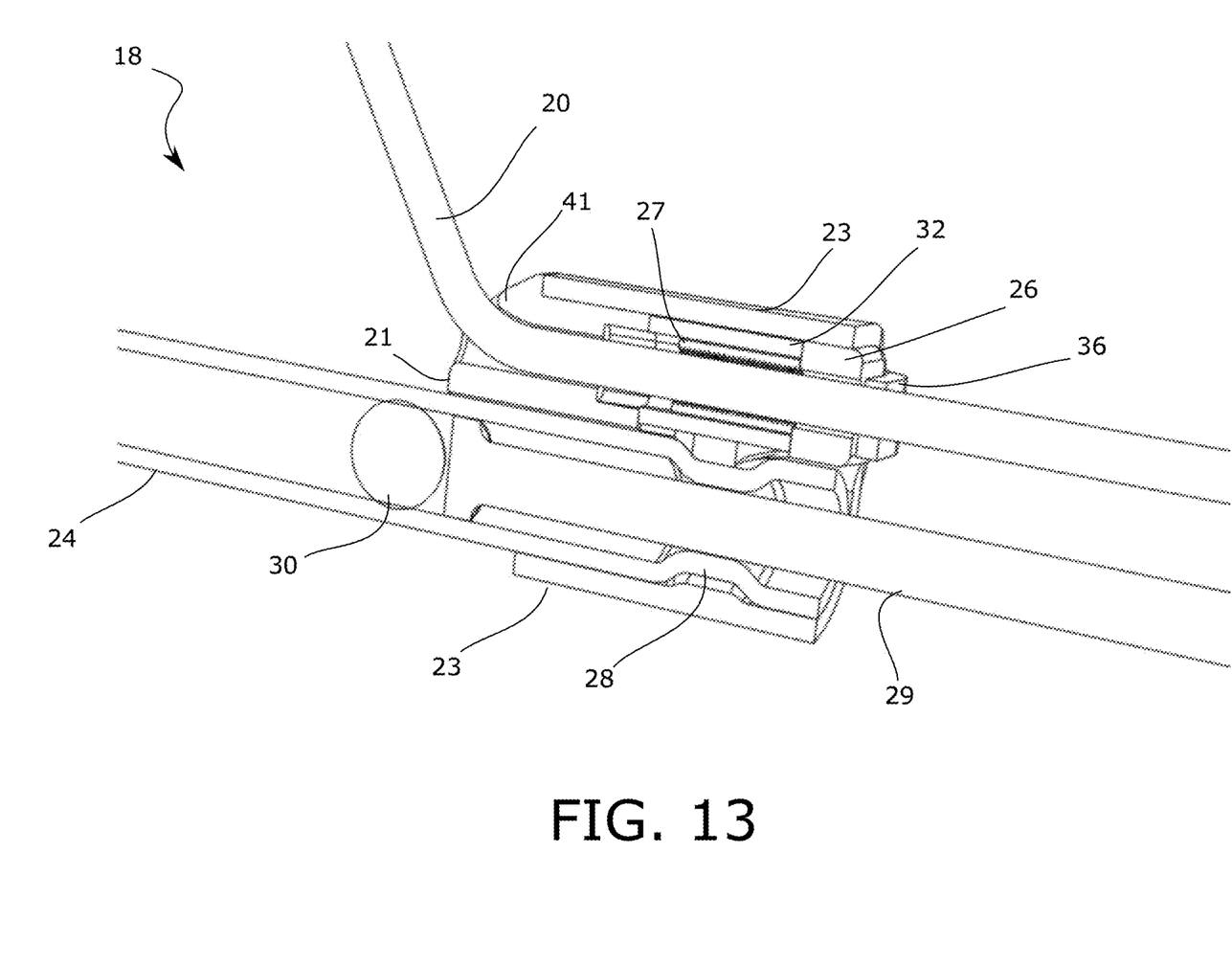
FIG. 13 is a side sectional view of the exemplary pretensioner device of FIG. 1 in a fired state.

FIGS. 12-14 show the pretensioner 18 in a fired stated, which occurs after the activation of the gas generator 31 due to the dynamic vehicle event. As shown in FIG. 14, springs 33 may displace the wedge 27 in the direction opposite of the pretensioning direction "A" (i.e. retraction direction). Movement of the wedge 27 and engagement of the wedge with the base frame and wedge holder prevents the cable 20 from displacing in the retraction direction.

In general, the pretensioner may operate as follows. After a dynamic event (e.g., an acceleration event of the vehicle greater than a predetermined high acceleration such as a vehicle crash) an electronic controller will trigger the gas generator 31 to activate. Once the gas generator activates, hot gases will flow into the pipe 24 and push the seal 30, driving the rod 29 in the pretensioning direction "A". The rod 29 will push swage block 22 in the same "A" direction. The movement of the swage block 22 causes a corresponding movement of the attached cable 20. The movement or pulling of the cable 20 causes a tightening of the seat belt or webbing 13 that removes slack from seatbelt 13 to restrain the occupant 11 of the vehicle seat. Once the swage block is fully driven and the cable is displaced, the wedge 27 will be pushed in the direction opposite the pretensioning direction (retraction direction) due to the springs 33. The wedge 27 will interface with the cable 20 on the wedge radially inward textured surface 34 and the wedge housing 32 on the wedge radially outward surface, gripping and holding the cable in place and thereby preventing the cable from moving in the retraction direction (i.e., in a direction that would loosen the restraint on the passenger).

In sum, the pretensioner configuration described herein and disclosed in the drawings is configured to reduce gas from escaping from the pretensioner. The disclosed pretensioner system does not require a gas tight seal around the cable.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the pretensioner as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A seatbelt pretensioner for a seat belt device in a vehicle, the pretensioner comprising:
   a cable connected to the seat belt device at a first end of the cable;
   a base frame containing a pipe, wherein a rod is located within the pipe, and wherein the entire cable is located outside of the pipe and wherein a first end of the rod is configured to be subjected to pressure from gas provided by a gas generator;
   wherein a second end of the cable and a second end of the rod are connected to a swage block;

wherein the rod is configured to be driven within the pipe in the pretensioning direction by gas from the gas generator when the gas generator initiates in response to an acceleration of the vehicle greater than a predetermined high acceleration thereby causing the swage block to move and pull the cable to thereby cause a corresponding movement of the seat belt device.

2. The seatbelt pretensioner of claim 1, further comprising a cable guide located partially within the base frame, wherein the cable guide is configured to receive the cable and guide a change of direction of the cable so that the cable extends in a direction parallel to the rod.

3. The seatbelt pretensioner of claim 1, further comprising:
a wedge housing located downstream of the cable guide;
a wedge located within the wedge housing;
wherein the wedge is configured to engage the wedge housing and the cable to prevent the cable from retracting in a retraction direction, wherein the retraction direction is opposite of the pretensioning direction.

4. The seatbelt pretensioner of claim 3, wherein the base frame further includes a spring located within the wedge housing, wherein the spring biases the wedge in the retraction direction.

5. The seat belt pretensioner of claim 4, wherein base frame further includes a spring holder, wherein movement of the cable in the pretensioning direction compresses the spring against the spring holder.

6. The seatbelt pretensioner of claim 3, wherein the wedge includes a textured surface configured to engage the cable.

7. The seatbelt pretensioner of claim 3, wherein the wedge comprises two halves, wherein each of the two halves are configured to converge away from the second end of the rod to thereby prevent the cable from retracting in a retraction direction.

8. A seat belt assembly for a vehicle, the seatbelt assembly comprising:
a seat belt webbing;
a cable connected to the seat belt webbing at a first end of the cable;
a base frame containing a pipe, wherein a rod is located in the pipe, and wherein the entire cable is located outside of the pipe and wherein a first end of the rod is configured to be exposed to pressure from gas provided by a gas generator;
wherein a second end of the cable and a second end of the rod are connected to a swage block;
wherein the rod is configured to be driven within the pipe in the pretensioning direction by gas from the gas generator when the gas generator initiates in response to an acceleration of the vehicle greater than a predetermined high acceleration thereby causing the swage block to move and pull the cable to thereby cause a corresponding movement of the seat belt webbing.

9. The seat belt assembly of claim 8, further comprising a cable guide located partially within the base frame, wherein the cable guide is configured to receive the cable and guide a change of direction of the cable so that a portion of the cable adjacent to the second end of the cable extends in a direction parallel to the rod.

10. The seat belt assembly of claim 8, further comprising:
a wedge located within the base frame;
wherein the wedge is configured to engage a portion of the base frame and the cable to prevent the cable from retracting in a retraction direction, wherein the retraction direction is opposite of the pretensioning direction.

11. The seat belt assembly of claim 10, further comprising a spring located in the base frame, wherein movement of the cable in the pretensioning direction compresses the spring against a spring holder.

12. The seat belt assembly of claim 11, wherein the spring is configured to bias the wedge in a retraction direction against the portion of the base frame to prevent the cable from retracting in a retraction direction.

13. The seatbelt pretensioner of claim 10, wherein the wedge includes a textured surface configured to engage the cable.

14. The seat belt assembly of claim 10, wherein the wedge is configured to converge away from the second end of the cable and wherein the portion of the base frame is configured with to include a surface that engages the wedge and is sloped correspondingly to the convergence of the wedge.

15. A seatbelt pretensioner for a seat belt device in a vehicle, the pretensioner comprising:
a cable connected to the seat belt device at a first end of the cable;
a base frame containing a pipe, wherein a rod is located within the pipe, and wherein the entire cable is located outside of the pipe, and
wherein a first end of the rod is configured to be subjected to pressure from gas provided by a gas generator and a second end of the rod is connected to the second end of the cable;
wherein the rod is configured to be driven within the pipe in the pretensioning direction by gas from the gas generator when the gas generator initiates in response to an acceleration of the vehicle greater than a predetermined high acceleration thereby causing the rod to move and pull the cable to thereby cause a corresponding movement of the seat belt device
a wedge located in the base frame and configured to engage the cable and the base frame to prevent the cable from retracting in a retraction direction, wherein the retraction direction is opposite of the pretensioning direction.

16. The seatbelt pretensioner of claim 15, further comprising a cable guide located partially within the base frame, wherein the cable guide is configured to receive the cable and guide a change of direction of the cable so that the cable extends in a direction parallel to the rod.

17. The seatbelt pretensioner of claim 15, wherein the second end of the cable is connected to the second end of the rod by a swage block.

18. The seatbelt pretensioner of claim 17, wherein the base frame further includes a spring, wherein movement of the cable in the pretensioning direction compresses the spring against the base frame.

19. The seat belt pretensioner of claim 18, wherein the spring is configured to bias the wedge in the retraction direction to prevent the cable from retracting in a retraction direction.

20. The seatbelt pretensioner of claim 15, wherein the wedge is configured to converge away from the second end of the cable and wherein the wedge engages a surface of the base frame that is sloped correspondingly to the convergence of the wedge to thereby prevent the cable from retracting in a retraction direction when the wedge.

\* \* \* \* \*

UNITED STATES PATENT AND TRADEMARK OFFICE
CERTIFICATE OF CORRECTION

| | | |
|---|---|---|
| PATENT NO. | : 11,766,991 B2 | Page 1 of 1 |
| APPLICATION NO. | : 17/564946 | |
| DATED | : September 26, 2023 | |
| INVENTOR(S) | : Mark Gray | |

It is certified that error appears in the above-identified patent and that said Letters Patent is hereby corrected as shown below:

In the Claims

Column 8, Lines 58-63 - Claim 20 should read as:
The seatbelt pretensioner of claim 15, wherein the wedge is configured to converge away from the second end of the cable and wherein the wedge engages a surface of the base frame that is sloped correspondingly to the convergence of the wedge to thereby prevent the cable from retracting in a retraction direction.

Signed and Sealed this
Fourteenth Day of November, 2023

Katherine Kelly Vidal
*Director of the United States Patent and Trademark Office*